United States Patent [19]

Foster

[11] 3,991,831
[45] Nov. 16, 1976

[54] COMBINATION POST-PLOWING CULTIVATING IMPLEMENT AND FIELD DRAG

[75] Inventor: Phillip W. Foster, Rochelle, Ill.

[73] Assignee: Lee Blacksmith, Inc., Rochelle, Ill.

[22] Filed: Apr. 7, 1975

[21] Appl. No.: 565,861

[52] U.S. Cl. .............................. 172/198; 172/614; 172/645; 172/657; 172/691; 172/705; 172/742; 172/763
[51] Int. Cl.² .................... A01B 49/02; A01B 31/00
[58] Field of Search ........... 172/160, 193, 194, 197, 172/198, 311, 391, 456, 611, 613, 614, 618, 643, 645, 646, 657, 686, 687, 691, 705, 706, 707, 708, 713, 741, 742, 762, 763

[56] References Cited
UNITED STATES PATENTS

| 231,257 | 8/1880 | Barley | 172/713 |
|---|---|---|---|
| 681,070 | 8/1901 | Oran | 172/691 X |
| 817,150 | 4/1906 | Allen | 172/763 X |
| 839,800 | 1/1907 | Adix | 172/391 |
| 856,471 | 6/1907 | Kirkeberg | 172/198 X |
| 1,710,420 | 4/1929 | Hoekstra | 172/198 |
| 2,758,531 | 8/1956 | Siems | 172/193 X |
| 3,043,377 | 7/1962 | Urben | 172/611 |
| 3,100,018 | 8/1963 | Sokolowski | 172/160 |
| 3,500,936 | 3/1970 | Vigen | 172/198 |
| 3,827,505 | 8/1974 | Sosalla | 172/707 |

OTHER PUBLICATIONS

"Pressure-Matic and Clod-Buster Plow Harrows", Royal Industries, Noble Division, Sac City, Iowa, May, 1975.

*Primary Examiner*—Richard T. Stouffer
*Attorney, Agent, or Firm*—Leydig, Voit, Osann, Mayer & Holt, Ltd.

[57] ABSTRACT

A field drag particularly adapted for use in conjunction with a post-plowing cultivating implement includes a mounting bar section pivotally secured to the frame of the implement and extending in a rearward direction behind the implement. A plurality of spaced, soil-working teeth are secured to the bar section and extend downwardly therefrom and generally toward one end of the bar section so as to form an acute included angle with respect to the bar section. An adjustable spring tension arrangement pulls the bar section resiliently toward the implement thereby urging the teeth into the soil as the drag is pulled across a seedbed to break up and pulverize clods and smaller chunks of earth into loose soil. In a modified form, the teeth may be fastened to the bar section to slant selectively toward one end or the other of the bar section.

1 Claim, 7 Drawing Figures

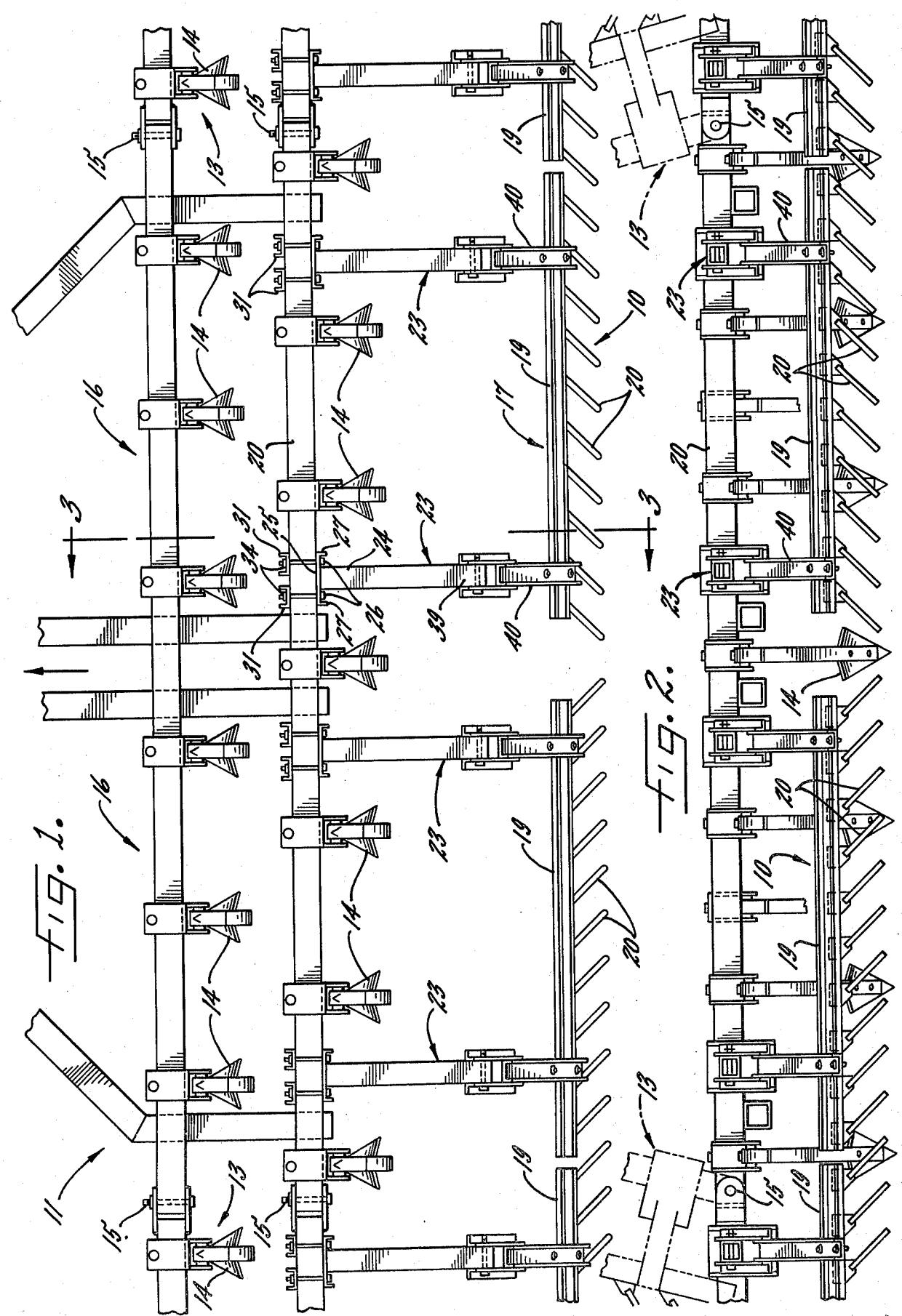

COMBINATION POST-PLOWING CULTIVATING IMPLEMENT AND FIELD DRAG

BACKGROUND OF THE INVENTION

The present invention relates generally to a harrow of the type which is attached behind a cultivating device to break up the clods of earth turned up by the working parts of the device into smaller chunks so as to help level the seedbed being worked and to conserve soil moisture. One such harrow particularly designed for use in conjunction with a plow is constructed with a single mounting bar which extends across at least a portion of the path of the soil being worked by the plow. Attached to the bar is a plurality of soil-working teeth extending in a generally perpendicular direction from the bar for engagement with the soil to break up the clods. To adjust the action of the harrow for different soil conditions, the bar is secured pivotally with respect to the frame of the plow with an adjustable spring tension arrangement acting between the bar and the frame. With this arrangement, the teeth may be slanted at different rearward angles with respect to the soil in the direction which the harrow is being pulled through the soil. In addition, vertical adjustment of the mounting bar provides for setting the depth to which the teeth may embed in the soil at a given rearward angle so as to obtain the best working action from the teeth for a given set of soil conditions.

Examples of harrows of the foregoing type are disclosed in U.S. Pat. No. 3,100,018 and in a brochure entitled Pressure-Matic and Clod Buster Plow Harrows published by Royal Industries Noble Division of Sac City, Iowa.

While the single-bar harrow of the foregoing type has the advantage of being easily maneuverable with a plow, the harrow is found to be unacceptable for use with post-plowing cultivating implements such as a field cultivator or a disk harrow inasmuch as the chunks of earth left behind the harrow are not broken up sufficiently to provide a good seedbed for planting or for proper cultivation of a planted crop. To adequately break up and pulverize the chunks of earth into loose level soil behind the implement, present usage is to employ a large multiple bar field drag in conjunction with the implement. A multiple bar field drag is one including several spaced, parallel mounting bars connected together and extending laterally across the path of travel of the implement with each of the bars having a plurality of the soil-working teeth attached thereto and extending downwardly therefrom to embed in the earth. Although a multiple bar drag usually will do an adequate job of working the seedbed, due to the size of the drag it substantially decreases the maneuverability and handling of the implement to which it is attached both in the field and on the road. Moreover, owing to the weight added by the drag behind the implement, the drag may detrimentally affect the soil-working action of the implement itself. One example of a multiple bar field drag is disclosed in U.S. Pat. No. 3,043,377.

SUMMARY OF THE INVENTION

The primary object of the present invention is to provide a simple, inexpensive field drag particularly adapted for use in conjunction with a post-plowing cultivating implement so as to achieve both the maneuverability advantages of a single bar drag and the soil-working advantages of a multiple bar drag without the disadvantages of either the single or multiple bar drags.

A more detailed object is to achieve the foregoing by constructing the drag to be generally of the single bar type but with the soil-working teeth especially oriented on the mounting bar so that, in service use, the soil is churned and rolled in front of the bar to break up the clods and chunks of earth into loose soil which then is metered evenly between the teeth flowing behind the drag to leave a smooth and level seedbed.

In a modified embodiment, the invention also resides in the novel construction of the drag for adjustment of the teeth to slant generally toward one end or the other of the mounting bar.

These and other objects and advantages of the present invention will become more apparent from the following detailed description when taken in conjunction with the accompanying drawings.

BRIEF DESCRIPTION OF THE DRAWINGS

FIG. 1 is a fragmentary plan view of a post-plowing cultivating implement with a field drag embodying the novel features of the present invention attached thereto.

FIG. 2 is a fragmentary rear elevational view of the implement shown in FIG. 1 with opposite sides of the implement shown in phantom folded positions.

DETAILED DESCRIPTION OF THE PREFERRED EMBODIMENTS

Figure 3:
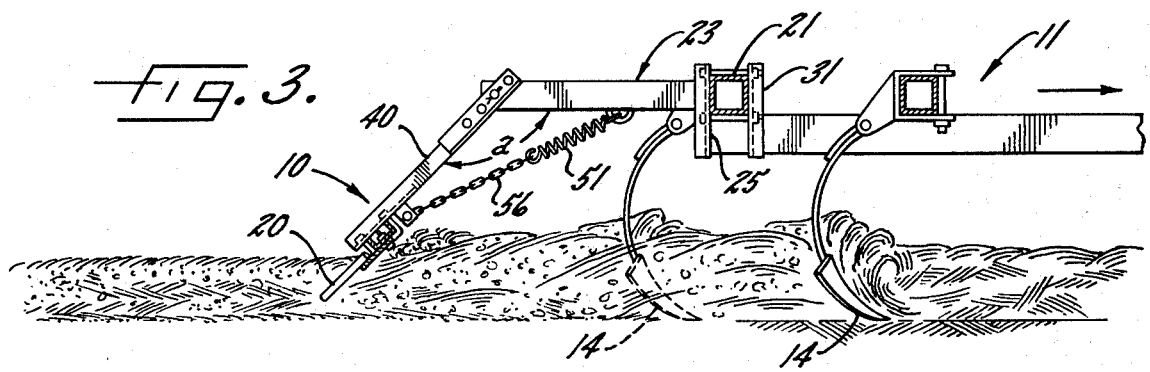
FIG. 3 is a fragmentary, cross-sectional view taken substantially along line 3—3 of FIG. 1.
Figure 4:
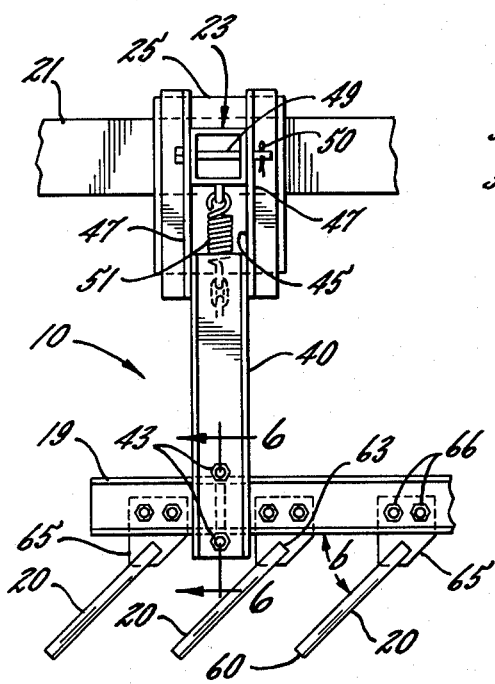
FIG. 4 is an enlarged, fragmentary elevational view similar to FIG. 2.
Figure 5:
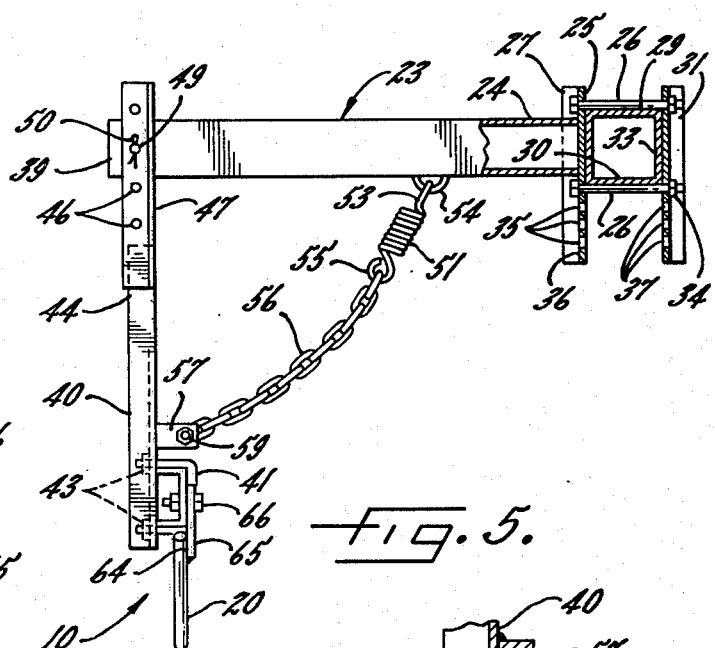
FIG. 5 is an enlarged, fragmentary side view with portions of the drag broken away and shown in cross section.
Figure 6:
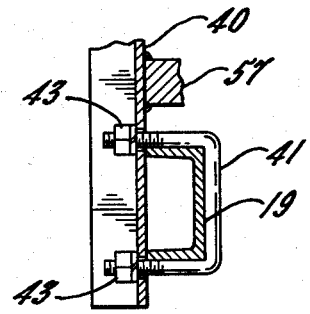
FIG. 6 is an enlarged, fragmentary cross-sectional view taken substantially along line 6—6 of FIG. 4.

In preparing a seedbed for planting and in cultivating growing crops, it is known to be good farming practice to conserve the moisture in the soil by breaking up the capillary passages in the upper layer of the soil to keep the moisture from rising to the surface and evaporating into the air. The present invention is embodied in a harrow or field drag 10 adapted to be secured to a cultivating device to trail behind the device as it is pulled across the seedbed to break up the clods of earth turned up by the device. Herein, the exemplary drag is particularly suited for use in conjunction with a post-plowing cultivating implement such as the field cultivator 11 shown in the drawings or a disk harrow (not shown). In the past, multiple bar harrows were used in order to properly level the seedbed and to break up and pulverize the clods and smaller chunks of earth into loose soil. It will be appreciated, however, that such harrows are quite cumbersome, difficult to handle and substantially reduce the maneuverability of the implement both in the field and on the road. For instance, the spike tooth harrow is particularly difficult to handle and transport when attached to a large cultivating implement such as the cultivator 11 in which outer gangs 13 of rows of soil-working parts or shovels 14 may be folded at hinges 15 upwardly and over the inner gangs 16 to narrow the implement for travel on the road.

Moreover, because of its great bulk and added weight behind the implement, this type of harrow often detrimentally affects the normal working action of the implement to which the harrow is attached.

Another type of harrow which is more maneuverable and less cumbersome than the multiple bar harrow is a single bar harrow such as those harrows disclosed in the aforementioned brochure and U.S. Pat. No. 3,100,018. These latter harrows are designed particularly for use in conjunction with plows so as to break up the large clods of earth turned up by the plowshares into smaller chunks and to roughly smooth out the seedbed in an initial stage of preparation prior to disking and cultivating.

Herein, the exemplary field drag 10 is similar in construction to the single bar type of harrow and includes a single mounting bar 17 divided into four sections 19 each having a plurality of soil-working teeth 20 secured thereto and extending downwardly therefrom for engagement with the soil. One of the sections is fastened to the frame 21 of the cultivator behind the rearmost row of cultivator shovels 14 in each of the gangs 13 and 16 to work the soil behind the cultivator 11. Advantageously, the two outer sections are movable with the outer gangs 13 of the cultivator and thus, may be folded easily with the gangs into a road travel position. As shown in FIGS. 1, 2 and 3, the sections are supported on the cultivator frame in essentially the same way. Accordingly, the support arrangement for only one of the sections will be described in detail, it being appreciated that such a description applies equally well to the other sections unless stated otherwise.

To support the drag section 19 on the frame 21, of the cultivator 11, two spaced, parallel support beams 23 each with a forward end portion 24 are fastened to the cultivator frame and extend rearwardly therefrom. Welded vertically across the forward end of each beam is a rearwardly opening channel 25 abutting the frame. Four bolts 26 are telescoped through each of the channels adjacent the opposite sides 27 thereof and along the upper and lower sides 29 and 30 of the frame. The bolts project forwardly from the front side 33 of the frame and through two small channel pieces 31 which are secured against the front side by four nuts 34 threaded on the ends of the bolts. Preferably, vertically spaced holes 35 are formed through the web 36 of the channel adjacent the opposite sides thereof to receive the bolts and similar holes 37 are provided in the pieces so that the beams may be secured to frames of different sizes, depending upon the make and model of cultivator to which the drag section is attached. Pivotally connected to the rearward end portions 39 of the two beams are two depending arms 40 and attached to the lower end portions of the arms is the section 19 of the mounting bar 17.

Herein, the bar section 19 is fastened to the arms 40 by U-bolts 41 which are telescoped rearwardly across the bar and through the lower end portions of the arms to be secured in a place by nuts 43. Preferably, the arms are adjustable in length so that drags 10 of identical construction may be attached to different sizes of cultivators and so as to provide means for varying depth to which the teeth 20 may embed in the soil as may be desirable for different soil conditions. To provide such adjustment, the upper end portion 44 of each arm 40 is formed with a U-shaped opening 45 receiving the rearward end portion 39 of the beam 23. Vertically spaced holes 46 formed in the opposite sides 47 of the arm selectively receive a pivot pin 49 which also is telescoped through the beam and held in place by a clip 50 for adjustment in the length of the arm.

In addition to adjusting the depth to which the teeth 20 embed in the soil for different soil conditions, it also is desirable to adjust the rearward angle formed between the teeth and the ground in the direction which the drag 10 is being pulled across the seedbed. In the present instance, such angle is represented by the angle $a$ shown in FIG. 3. Herein, adjustment in the angle $a$ is achieved by adjusting the force with which the teeth are urged into the soil by two tension springs 51. The latter are connected between the two arms 40 and their associated beams 23 and urge the arms resiliently in a clockwise direction as is seen in FIG. 3 against the direction which the cultivator 11 is being pulled. In connecting the springs between their associated arms and beams, the forward ends 53 of the springs are hooked within metal loops 54 on the undersides of the beams and the rearward ends 55 of the springs are secured to the forward ends of two chains 56. The rearward ends of the chains are fastened by bolts 59 to tongues 57 extending forwardly from each of the arms, the bolts being telescoped through links in the chains. By fastening the bolts through links either closer to or farther away from the ends of the springs, the in-service-use tension in the springs may be increased or decreased as desired for different soil conditions. In this way, the angle $a$ at which the teeth 20 embed into the soil may be adjusted to either increase or decrease depending upon the extent to which the arms are pulled toward the rear of the cultivator.

In accordance with the primary aspect of the present invention, the exemplary field drag 10 is constructed in a novel fashion particularly for use with a post-plowing cultivating implement such as the cultivator 11 so as to achieve both the maneuverability advantages of a single bar harrow and the soil-working advantages of a multiple bar drag without the usual disadvantages of either. For these purposes, the soil-working teeth 20 are fastened to the mounting bar 17 so as to extend downwardly from the bar and generally toward one end 60 thereof at an acute included angle $b$ with respect to the bar. More particularly, the lower ends 60 of the teeth are disposed vertically below the upper ends 63 of the next adjacent teeth located toward the one end of the bar. By virtue of this unique construction, in service use, the soil behind the implement is churned and rolled in front of the bar to break up and pulverize the chunks of earth with the resulting loose soil eventually flowing in a metered fashion between the teeth and behind the drag to smooth out and level the seedbed to an extent beyond the capabilities of prior single bar harrows.

In the present instance, each tooth 20 is formed of a piece of metal rod and is welded to the rearward face 64 of a generally rectangular metal plate 65. Each of the metal plates are, in turn, fastened to the mounting bar section 19 by means of bolts 66 so that the teeth may be replaced easily should they become broken or bent in service use. Preferably, at least two of the teeth are fastened to the bar section for each foot in length of the section. Moreover, the angle $b$ is approximately 45° so that the perpendicular distance from the upper end of each tooth to its lower end is approximately equal to the spacing between each of the teeth. In addition, as shown in FIG. 1, the teeth connected to each of the two mounting bar sections on opposite sides of the centerline of the cultivator 11 are slanted generally toward the centerline of the cultivator so that the soil is rolled and churned in front of the drag along the entire length thereof.

Figure 7:
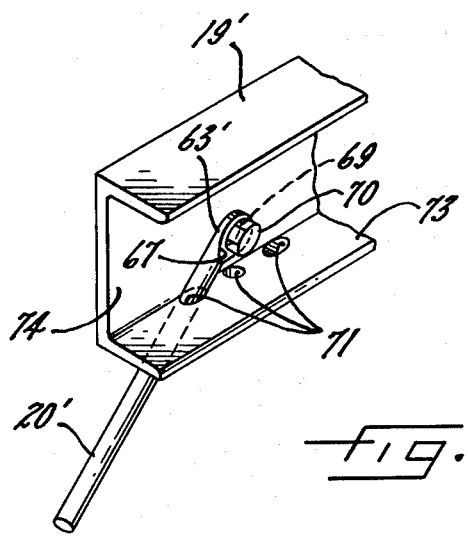
FIG. 7 is a fragmentary, perspective view showing an alternative arrangement for mounting the teeth on the drag.

In an alternative embodiment shown in FIG. 7, with parts corresponding to the first form of the invention identified by the same but primed reference numbers, the teeth 20' are mounted on the mounting bar section 19' for selective angular adjustment relative to the bar section. Herein, this is achieved by forming the tooth rod with a flat 67 on the upper end 63' thereof and a hole 69 through the flat so the rod may be fastened to the web of the mounting bar section by means of a single bolt 70. For selective angular adjustment between positions extending perpendicular to or at a slant generally toward either end of the bar section, three spaced apertures 71 are formed through the lower side 73 of the bar section. Accordingly, depending upon the particular position desired for a tooth, the latter is telescoped through the appropriate aperture for fastening to the web 74 of the bar section.

Thus, it is seen from the foregoing, that the field drag 10 of the present invention is adapted particularly for use in conjunction with post-plowing cultivating implements such as the cultivator 11 by providing the maneuverability and handling advantages of a single bar harrow and the desirable soil-working capabilities of a multiple bar drag. Advantageously, this is achieved by fastening the soil-working teeth 20 of the drag to the mounting bar section 19 to slant downwardly from and generally toward one end of the section. By virtue of this construction, the soil being worked by the drag is rolled and churned in front of each of the mounting bar sections to break up chunks of earth into loose soil which ultimately flows in a metered fashion between the teeth to spread out on the seedbed and thereby provide a smooth, level and well prepared surface.

I claim as my invention:

1. In combination, a post-plowing cultivating implement including a frame with a plurality of spaced rows of soil-working parts connected thereto for engagement with the ground, and a field drag attached to said frame and extending rearwardly behind the rearmost row of said parts, said drag including a support beam with one end attached to said frame and projecting rearwardly therefrom, an arm pivotally connected to and depending from the other end of said beam for movement toward and away from said implement, said arm being selectively adjustable in length away from said beam, an elongted mounting bar section connected to the lower end of said arm and extending laterally therefrom generally in a horizontal direction parallel with said rearmost row of said soil-working parts, a series of spaced teeth secured to said bar section along the lower edge thereof, substantially all of said teeth extending generally parallel with each other in a direction slanted downwardly from and generally toward one end of said section at an acute included angle with respect to the lower edge of said section, at least two of said teeth being connected to said mounting bar section for approximately each linear foot thereof and the length of each of said teeth being such that the lower end of each of said teeth is disposed generally vertically below the upper end of the next adjacent one of said teeth toward said one end of said section, a spring connected between said arm and said frame and urging said arm toward said frame so as to urge said teeth toward the ground to embed in and work the soil behind said implement, and means for adjusting the force with which said spring urges said arm toward the implement.

* * * * *